Figure 1:
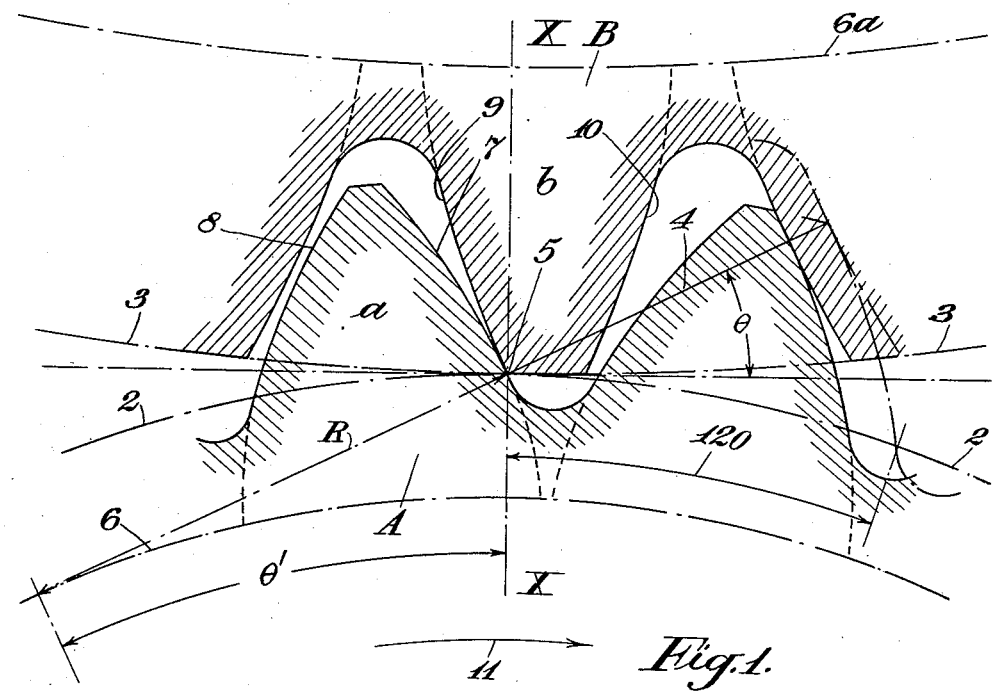

Oct. 24, 1939.   S. S. COOK ET AL   2,176,956
TOOTHED GEARING
Filed Nov. 11, 1933

Patented Oct. 24, 1939

2,176,956

UNITED STATES PATENT OFFICE 2,176,956

TOOTHED GEARING

Stanley Smith Cook and Louis Mortimer Douglas, Wallsend-on-Tyne, England, assignors to The Parsons Marine Steam Turbine Company Limited, Wallsend-on-Tyne, England Application November 11, 1933, Serial No. 697,570

10 Claims. (Cl. 74—462)

The invention relates to toothed gearing and aims primarily at providing a form of gearing that shall reduce the amount of wear in operation.

It has been noticed that with teeth of the usual contour, the addendum portion often shows a polished surface after wear while the dedendum portion is roughened or pitted.

To overcome such difficulties, the present invention consists in the improvements in toothed gearing hereinafter described and particularly pointed out in the claims.

Arising from the observation above noted as to the part of the teeth that becomes worn, one feature of the present invention consists in the application to intermeshing gear elements of the all-addendum principle, in accordance with which the working faces of the teeth of one element are outside, and those of the other element inside, their respective pitch circles.

A second feature of the invention is the application of the all-addendum principle to involute teeth so as to obtain the advantages which teeth of that type possess over teeth of a cycloidal form, the chief of such advantages being that involute teeth can be generated from rack cutters with straight flanks, the same cutters or hobs can be used to generate both wheel and pinion teeth and the gears are not sensitive to change of the distance between centres, that is to say, they transmit motion uniformly and gear correctly at any centre distance at which they are in mesh.

Pure rolling between two tooth surfaces in engagement only occurs when they are in contact at the pitch point. At all other points of engagement there is a relative sliding motion as well as rolling, and this sliding motion changes its direction as the pitch point is passed.

The use of the all-addendum principle secures that the sliding motion between engaging teeth is in one direction only and it is believed that this avoidance of reversal of the direction of sliding is of importance in producing the polished surface and absence of pitting that have been observed.

In order, however, to keep the maximum amount of sliding within reasonable limits, the pressure angle is increased from usual values to such an extent that it lies between 22½° to 30°, and these values constitute the third essential feature of the invention.

By the combination of such features, it is found that the following aggregate of advantages is secured:

(a) The relative curvature of the wheel and pinion tooth contours is less, so that larger intensities of pressure can be used;

(b) Relative sliding between engaging teeth is always in one and the same direction;

(c) Engagement takes place only during the arc of recess;

(d) Undercutting of the teeth is avoided even in small pinions;

(e) Owing to the increased angle of pressure, the teeth are broader at the base and therefore of a more robust form;

(f) The gears are very smooth-running; and (g) Pitting and roughening are avoided.

Figure 2:
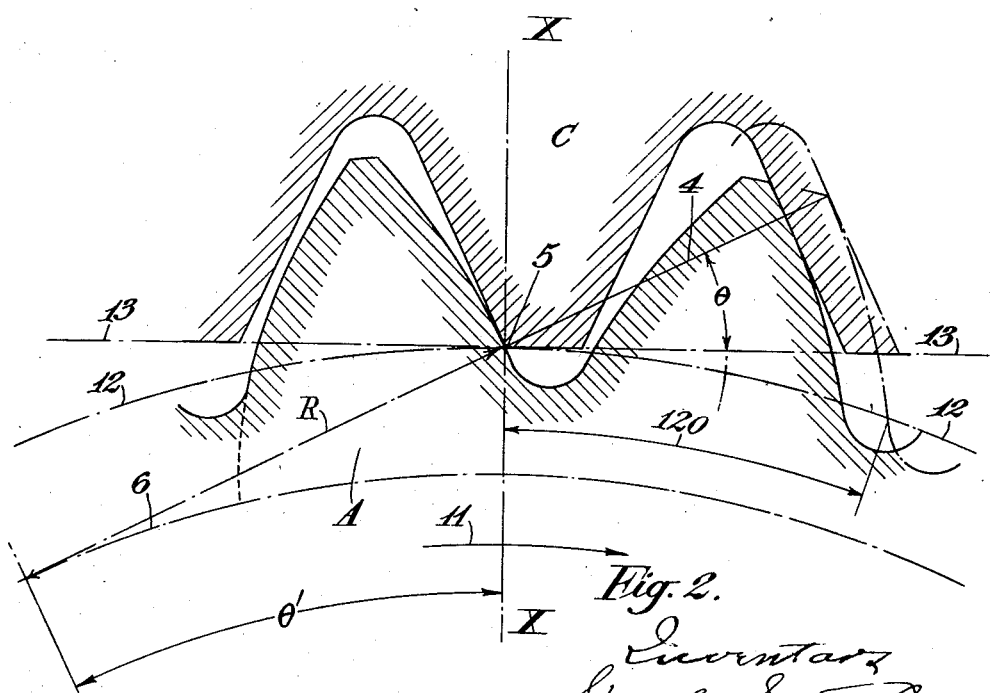

Referring to the accompanying diagrammatic drawing:

Figure 1 illustrates one form of the present invention in which a toothed pinion engages a wheel, and Figure 2 illustrates a modified form in which a toothed pinion engages a rack, both figures being in a plane at right angles to the axis or axes of rotation.

Referring to the form of the present invention illustrated in Figure 1, a pinion A engages a wheel B, the respective pitch circles being indicated at 2 and 3.

The line of contact, which in involute teeth is straight, is indicated at 4 and passes through the pitch point 5. The base circles from which the contours of the involute teeth are derived, are shown at 6 and 6a.

It will be understood that in accordance with the usual geometry of involute gearing, the radii of the base circles 6 and 6a are proportional to the number of teeth in the wheel and pinion respectively, and with any given distance between the axes, the pitch point is the point lying between the axes of the gears determined by the intersection of a common tangent to the base circles with the line through the axes of the gears.

It will be seen that taking a tooth $a$ of the pinion, its working surfaces 7 and 8 lie wholly outside the pitch circle 2, in other words, that the tooth is all-addendum.

Similarly, the working surfaces 9 and 10 of the tooth $b$ of the wheel are all-dedendum, that is, they lie wholly within the pitch circle 3.

The pressure angle $\theta$, that is the angle between the line of pressure or contact 4 and a line at right angles to that joining the axes of the gears is shown about 25° in Figure 1.

If the pinion A is the driver and rotates in the direction of the arrow 11, it will be seen that contact between the teeth takes place only during the arc of recess which is indicated by the numeral 120.

Further, it will be seen that since the line of contact 4 lies wholly outside the pinion pitch circle 2, and since the latter must be of greater diameter than the base circle 6, this difference being large in the present case owing to the large pressure angle, undercutting of the pinion teeth is entirely avoided however small in diameter the pinion may be.

Since the minimum radius of curvature R of the tooth flanks is the length of a tangent from the base circle to the pitch point, it will be seen that by reason of the large pressure angle, $\theta'$, this radius is large and the tooth curvature consequently small.

It will also be seen that the adoption of the large pressure angle results in a tooth having a very broad base.

Furthermore, the line of action or contact 4, in a plane at right angles to the axes of the gear elements, that is to say the line on which the contact between the interengaging teeth occurs, and which is that part of the common tangent to the two base circles which passes through the zone of intermesh of the respective gear elements, lies wholly on the leaving side of the line XX passing through the axes of the gears.

The teeth may be of the helical type, if desired, and are then preferably inclined at an angle of about 30° to a plane containing the axis of the relevant wheel.

While a particular case has been indicated in Figure 1 in which a pinion gears with a wheel, it will be obvious that the all-addendum principle may be applied to the case of a pinion gearing with a rack.

An example of such a combination is indicated in Figure 2 in which a pinion A engages a rack C, the pitch circle and pitch line being indicated at 12 and 13 respectively. The line of contact is indicated at 4 passing through the pitch point 5, and the base circle from which the contours of the involute teeth of the pinion A are derived is indicated at 6.

As before, the working surfaces of the pinion teeth lie wholly outside the pitch circle 12, the teeth being all-addendum and the working surfaces of the rack teeth all-dedendum.

By the term "all-addendum" in the present specification and claims, we mean that the working surfaces of the teeth flanks lie radially outside the pitch circles.

By "pitch circles", we mean circles passing through the pitch point and co-axial with the axes of rotation of the intermeshing gear wheels.

The case of a rack is included in the above definitions by considering the centres of the relative circles to be at an infinite distance.

Having now described our invention, what we claim as new and desire to secure by Letters Patent is:

1. The combination of driving and driven gear elements having teeth of involute form with respect to base circles concentric about the axes of rotation of the said elements, in which the teeth of one of said elements are all-addendum and the teeth of the other of said elements all-dedendum, with a pressure angle lying between 22½° and 30°.

2. The combination of a driving pinion and a driven gear wheel having teeth of involute form with respect to base circles concentric about the axes of rotation of the said elements, in which the teeth of said driving pinion are all-addendum and the teeth of said driven wheel are all-dedendum, with a pressure angle lying between 22½° and 30°.

3. The combination of driving and driven gear elements having teeth of involute form with respect to base circles concentric about the axes of rotation of the said elements and a pressure angle between 22½° and 30°, the pitch line corresponding to that pressure angle being situated substantially at the root of the working surface of the teeth of one of said elements and at the outer periphery of the teeth in the case of the other of said elements.

4. The combination of a driving pinion and a driven gear wheel having teeth of involute form with respect to base circles concentric about the axes of rotation of the said elements and a pressure angle between 22½° and 30°, the pitch circle corresponding to that pressure angle being situated substantially at the root of the working surface of the teeth in the case of said driving pinion and at the outer periphery of the teeth in the case of said driven wheel.

5. The combination claimed in claim 1 applied to a wheel and pinion, in which the teeth are of helical form inclined at an angle of about 30° to a plane containing the axis of the wheel.

6. The combination claimed in claim 1, in which the pressure angle is substantially 25½°.

7. The combination claimed in claim 1, in which one of the gear elements takes the form of a rack.

8. The combination claimed in claim 2 applied to a wheel and pinion in which the teeth are of helical form inclined at an angle of about 30° to a plane containing the axis of the wheel.

9. The combination claimed in claim 2 in which the pressure angle is substantially 25½°.

10. The combination claimed in claim 2 in which one of the gear elements takes the form of a rack.

STANLEY SMITH COOK.
LOUIS MORTIMER DOUGLAS.